US012759737B2

(12) United States Patent
Lisoski et al.

(10) Patent No.: US 12,759,737 B2

(45) **Date of Patent: *Oct. 13, 2026**

(54) OFF-CENTER PARACHUTE FLIGHT TERMINATION SYSTEM INCLUDING LATCH MECHANISM DISCONNECTABLE BY BURN WIRE

(71) Applicant: AEROVIRONMENT, INC., Arlington, VA (US)

(72) Inventors: Derek Lisoski, Simi Valley, CA (US); William Stuart Sechrist, Simi Valley, CA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/189,037

(22) Filed: Apr. 24, 2025

(65) Prior Publication Data

US 2025/0256869 A1 Aug. 14, 2025

Related U.S. Application Data

(63) Continuation of application No. 18/511,069, filed on Nov. 16, 2023, now Pat. No. 12,338,014, which is a (Continued)

(51) Int. Cl.
*B64U 70/83* (2023.01)
*B26F 3/12* (2006.01)
(Continued)

(52) U.S. Cl.
CPC ................ *B64U 70/83* (2023.01); *B26F 3/12* (2013.01); *B64D 17/34* (2013.01); *B64D 17/62* (2013.01);
(Continued)

(58) Field of Classification Search
CPC ............ B64C 30/024; B64C 2201/021; B64C 2201/185; B64D 17/34; B64D 17/72; B64D 17/724; B64D 17/80; B64F 3/12
(Continued)

(56) References Cited

U.S. PATENT DOCUMENTS 4,589,066 A 5/1986 Lam et al.
5,339,288 A * 8/1994 Blier ........................ G01V 1/38 367/145
(Continued)

FOREIGN PATENT DOCUMENTS

CN 108820230 A 11/2018

*Primary Examiner* — Brady W Frazier
(74) *Attorney, Agent, or Firm* — Command IP LLP; Pejman Yedidsion; Eric Aagaard

(57) ABSTRACT

Systems, devices, and methods including: a latching mechanism comprising: a first latch configured to attach to a door of an unmanned aerial vehicle (UAV); a second latch configured to attach to a portion of the UAV distal from the first latch; a string connected between the first and second latch, where the string secures the door shut; at least two radio modules in communication with a ground control station; and at least two burn wires in contact with a portion of the string between the first latch and the second latch; where current from a backup battery passes to at least one burn wire when the burn signal is received, where the burn wire causes the connection between the first latch and the second latch to be broken and the door of the UAV is separated from the UAV.

18 Claims, 10 Drawing Sheets

Related U.S. Application Data continuation of application No. 17/979,647, filed on Nov. 2, 2022, now Pat. No. 11,981,429, which is a continuation of application No. 17/605,754, filed as application No. PCT/US2020/029649 on Apr. 23, 2020, now Pat. No. 11,518,514.

(60) Provisional application No. 62/854,723, filed on May 30, 2019, provisional application No. 62/838,833, filed on Apr. 25, 2019, provisional application No. 62/838,783, filed on Apr. 25, 2019.

(51) Int. Cl.

| | |
|---|---|
| ***B64D 17/62*** | (2006.01) |
| ***B64D 17/80*** | (2006.01) |
| *B64D 17/34* | (2006.01) |
| *B64U 10/13* | (2023.01) |
| *B64U 20/65* | (2023.01) |

(52) U.S. Cl.
CPC .............. *B64D 17/80* (2013.01); *B64U 10/13* (2023.01); *B64U 20/65* (2023.01); *B64U 2201/20* (2023.01)

(58) Field of Classification Search
USPC .......................................................... 244/139
See application file for complete search history.

(56) References Cited

U.S. PATENT DOCUMENTS

| | | | | |
|---|---|---|---|---|
| 6,416,019 | B1 * | 7/2002 | Hilliard .................. | B64D 17/34 244/138 R |
| 6,697,973 | B1 | 2/2004 | Baumeister, IV et al. | |
| 2005/0034015 | A1 | 2/2005 | Hashimoto et al. | |
| 2009/0044050 | A1 | 2/2009 | Maimone et al. | |
| 2010/0168939 | A1 | 7/2010 | Doeppner et al. | |
| 2014/0257684 | A1 | 9/2014 | Wilder et al. | |
| 2015/0115106 | A1 * | 4/2015 | Coffey ................. | B64G 1/6455 244/158.2 |
| 2018/0130363 | A1 | 5/2018 | Yvetot et al. | |

* cited by examiner

OFF-CENTER PARACHUTE FLIGHT TERMINATION SYSTEM INCLUDING LATCH MECHANISM DISCONNECTABLE BY BURN WIRE

CROSS-REFERENCE TO RELATED APPLICATIONS

This application is a continuation of U.S. Non-Provisional patent application Ser. No. 18/511,069, filed Nov. 16, 2023, which is a continuation of U.S. Non-Provisional patent application Ser. No. 17/979,647, filed Nov. 2, 2022, which issued as U.S. Pat. No. 11,981,429 on May 14, 2024, which is a continuation of U.S. Non-Provisional patent application Ser. No. 17/605,754, filed Oct. 22, 2021, which issued as U.S. Pat. No. 11,518,514 on Nov. 16, 2022, which is a 35 U.S.C § 371 National Stage Entry of International Application No. PCT/US2020/029649, filed Apr. 23, 2020, which claims priority to and the benefit of U.S. Provisional Patent Application No. 62/838,783, filed Apr. 25, 2019, U.S. Provisional Patent Application No. 62/838,833, filed Apr. 25, 2019, and U.S. Provisional Patent Application No. 62/854,723, filed May 30, 2019, the contents of all of which are hereby incorporated by reference herein for all purposes.

FIELD OF ENDEAVOR

The invention generally relates to unmanned aerial vehicles (UAVs), and more particularly to flight termination of a UAV.

BACKGROUND

A flight termination system (FTS) includes onboard elements that provide for controlled termination of an aircraft's flight. An FTS may be independent from the aircraft to increase flight safety. An FTS is capable of terminating the flight of an aircraft in the case of a malfunction.

SUMMARY

A system embodiment may include: a latching mechanism, where the latching mechanism comprises: a first latch configured to attach to a door of an unmanned aerial vehicle (UAV); a second latch configured to attach to a portion of the UAV distal from the first latch; a string connected between the first latch and the second latch, where the string secures the door of the UAV shut; at least two radio modules in communication with a ground control station; and at least two burn wires in contact with a portion of the string between the first latch and the second latch; where at least one of the at least two radio modules may be configured to receive a burn signal from the ground control station, where current from a backup battery passes to at least one burn wire of the at least two burn wires when the burn signal may be received, where the burn wire melts a portion of the string causing the connection between the first latch and the second latch to be broken, and where the door of the UAV may be separated from the UAV when the connection between the first latch and the second latch may bebroken.

Additional system embodiments may include: a parachute disposed in the UAV, where the parachute may be deployed when the door of the UAV may be separated from the UAV. In additional system embodiments, the parachute may be disposed off-center of the UAV. In additional system embodiments, deploying the parachute may cause the UAV to spiral down to the ground in a controlled and predictable manner. In additional system embodiments, deploying the parachute may cause a drag force on a first side of the UAV, where the drag force slows down the first side of the UAV more than a second opposite side of the UAV inducing a torque on the UAV which results in a rotation of the UAV, and where the drag force combined with the induced torque causes the UAV to exit a current flight pattern and spiral down towards the ground.

In additional system embodiments, the at least two radio modules may include: a first radio module; and a second radio module. In additional system embodiments, the first radio module may include: an antenna; and an interface configured to receive the burn signal from the antenna, where the interface toggles the battery backup to pass current to a first burn wire of the at least two burn wires.

In additional system embodiments, the ground control station may be in communication with a terrestrial GPS receiver 130, a terrestrial RF emitter 109, a terrestrial RF receiver 132, and a visual band emitter 133. In additional system embodiments, the string may be made of a combustible material. In additional system embodiments, the at least two burn wires may be made of nichrome (NiCr).

A method embodiment may include: receiving a burn signal at an interface of a first radio module of two or more radio modules of a latching mechanism; toggling, via the interface, at least one battery backup to pass current from the battery backup to a first conducting burn wire of the first radio module, where the first conducting burn wire may be attached to a portion of a string; and melting, by the first conducting burn wire, a portion of a string connected between a first latch and a second latch, where the first latch may be configured to attach to a door of an unmanned aerial vehicle (UAV), where the second latch may be configured to attach to a portion of the UAV distal from the first latch, and where the string secures the door of the UAV shut.

Additional method embodiments may include: separating the door of the UAV from the UAV when the connection between the first latch and the second latch may be broken. Additional method embodiments may include: deploying an off-center parachute when the door of the UAV separates from the UAV. In additional method embodiments, deploying the off-center parachute causes the UAV to spiral down to the ground in a controlled and predictable manner. In additional method embodiments, deploying the parachute causes a drag force on a first side of the UAV, where the drag force slows down the first side of the UAV more than a second opposite side of the UAV inducing a torque on the UAV which results in a rotation of the UAV, and where the drag force combined with the induced torque causes the UAV to exit a current flight pattern and spiral down towards the ground.

In additional method embodiments, the string may be made of a combustible material. In additional method embodiments, the at least two burn wires may be made of nichrome (NiCr). Additional method embodiments may include: determining that the door did not separate from the UAV; receiving a second burn signal at a second interface of a second radio module of the two or more radio modules of the latching mechanism; toggling, via the second interface, the at least one battery backup to pass current from the battery backup to a second conducting burn wire of the first radio module, where the second conducting burn wire may be attached to a portion of the string; and melting, by the second conducting burn wire, a portion of the string connected between the first latch and the second latch.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
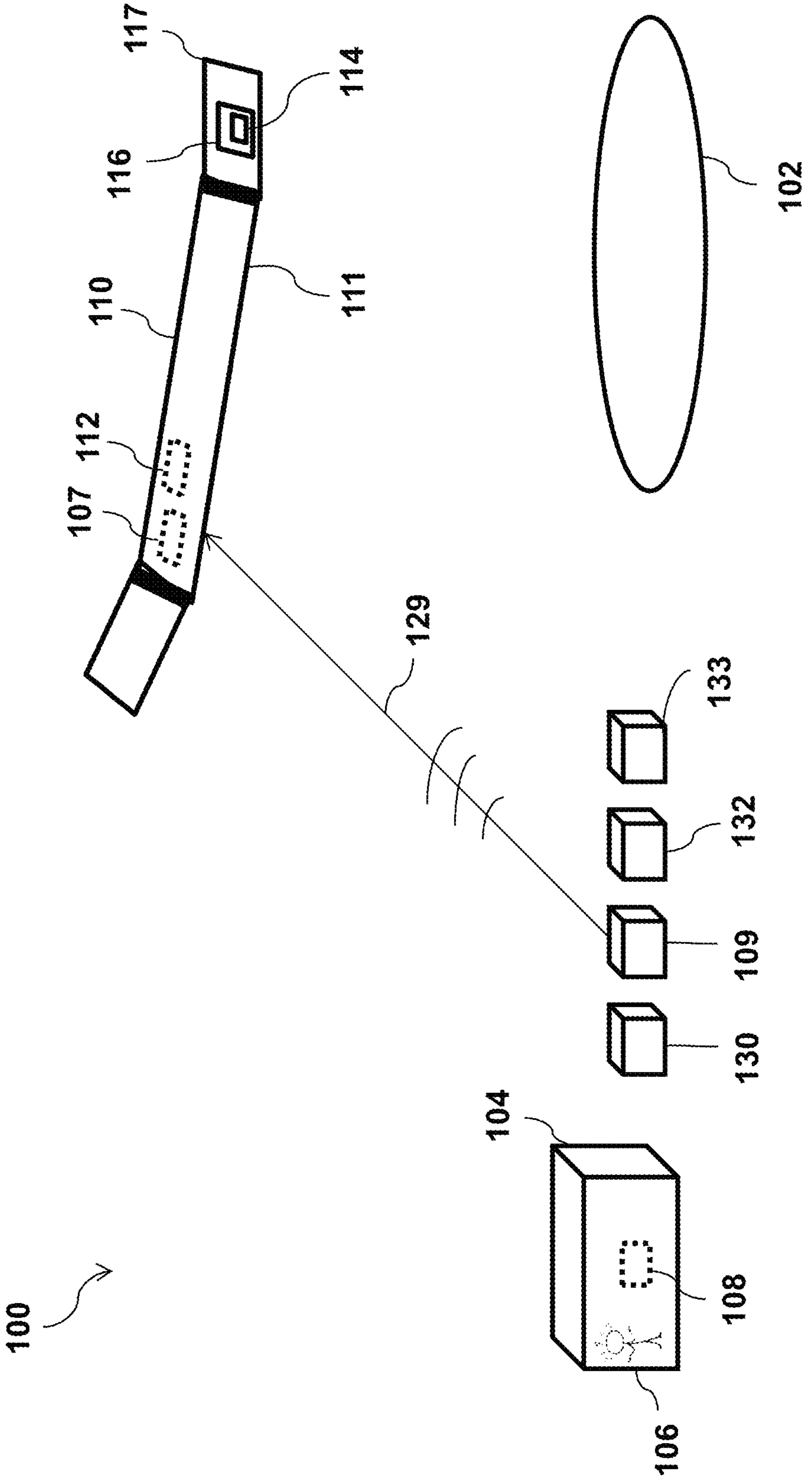
FIG. 1 depicts a system for deployment of an off-center parachute of an unmanned aerial vehicle, according to one embodiment.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

One embodiment of a flight termination system (FTS) is a self-destruct system controlled by a remote operator. Another embodiment of an FTS is a separation system that provides for separation of components, such as rockets from a fuselage in aeronautic applications. Another embodiment of an FTS is a parachute release system for safe landing in the case of power loss to the aircraft, equipment malfunction, and the like. One embodiment of the parachute system is an off-center parachute system of an unmanned aerial vehicle (UAV), wherein one parachute is disposed on a side of the UAV. Deployment of the off-center parachute causes the UAV to spiral down towards the ground, resulting in a slower and safer landing, as well as a predictable descent rate and flight path. Off-center parachute systems may include solenoids that are continuously engaged. If power is lost in the UAV, the solenoids may cause automatic deployment of the parachute. Other systems may include solenoids that automatically actuate to make the parachute deploy. Such configurations may not allow for manual operation and/or override. It is desired to have an off-center latch-string parachute system with redundancy failsafe measures with the capability for an operator to manually cause the parachute to deploy.

A system embodiment for deploying an off-center parachute of a UAV is presented. In one example, the UAV is a high altitude long endurance solar-powered aircraft. The off-center parachute system may include a string that keeps a latch. The string may include two redundant burn wires attached thereto to melt the string and make the parachute deploy. M ore specifically, if the string is burned by at least one of the burn wires, then the latch opens to cause deployment of the parachute. This dual burn wire configuration provides an independent and redundant system to eliminate possible failure of one of the systems. The redundancy also functions as a failsafe in case one of the burn wires malfunctions.

In the present embodiments, at each side where the wire is attached to the string, the wire may melt the string. Additionally, each wire may be associated with circuitry, including a radio, an antenna, and an interface. The circuitry may be configured to receive a command signal, wirelessly or by wire, from an operator to deploy the parachute and the aircraft spirals down to the ground. This configuration provides for the flexibility of an operator to transmit a command signal for manual deployment of the parachute.

With reference to FIG. 1, a system 100 for deployment of an off-center parachute of an unmanned aerial vehicle (UAV) 110 is illustrated. UAVs are aircraft with no onboard pilot and may fly autonomously or remotely. In one embodiment, the UAV 110 is a high altitude long endurance aircraft. In one embodiment, the UAV 110 may have one or more motors, for example, between one and forty motors, and a wingspan between 100 feet and 400 feet. In one embodiment, the UAV 110 has a wingspan of approximately 260 feet and is propelled by a plurality of motors, for example, ten electric motors. The electric motors of the UAV 110 may be powered by a solar array covering a portion of the surface of the wing, resulting in zero emissions. Flying at an altitude of approximately 65,000 feet above sea level and above the clouds, the UAV 110 is designed for continuous, extended missions of up to months without landing.

The UAV 110 functions optimally at high altitude due at least in part to the lightweight payload of the UAV and is capable of considerable periods of sustained flight without needing to land. In one embodiment, the UAV 110 may weigh approximately 3,000 lbs and may include wing panel sections and a center panel, providing for efficient assembly and disassembly of the UAV 110 due to the attachability and detachability of the wing panel sections to each other and/or to the center panel.

The off-center parachute deployment system 100 allows for a stable and predictable landing of a UAV that has lost power or has experienced other difficulties, rendering the UAV unable to maintain flight. This may be achieved by an operator 106 at a ground station 104 triggering the deployment of a parachute on the UAV 110. The parachute may be located on one side of the UAV 110, causing the UAV 110 to spiral down for a controlled and predictable descent once the parachute is deployed.

In one embodiment, activation of the off-center parachute deployment system 100 may shut off control of the motor or other flight controls; therefore, the UAV 110 may not stop the turn resulting from the off-center parachute deployment. In the event that the activation was inadvertent or caused by an anomaly, a command may be sent by the operator 106 to the off-center parachute deployment system 100 to re-enable control of the motor or other flight controls. This may allow the UAV 110 to stop the initiated turn and to regain some level of control over the landing pattern.

In one embodiment, the UAV 110 descends and lands at a landing area 102 for general repairs, maintenance, and the like. The aircraft 110 may be re-launched at a later time. In another embodiment, the UAV 110 descends to a site not at the landing area 102, rather at a place generally below the flight pattern traveled by the aircraft 110.

In one embodiment, the landing area 102 is of a circular shape allowing for approach and take-off from the landing area 102 in any direction. Other landing area shapes are possible and contemplated. The landing area may be paved with asphalt or concrete. In other embodiment, the landing area may be made of grass or another organic material.

The ground control station 104 may be in communication with the UAV 110. The ground control station 104 may be the central hub for the aircraft control. With respect to FIG. 1, the UAV 110 is in a geostationary flight pattern within the stratospheric layer of the atmosphere and may be within a beam width of a terrestrial radio frequency (RF) emitter associated with the ground station. In one embodiment, the UAV 110 may be within a beam width of a terrestrial GPS receiver 130 associated with the ground station 104. The GPS receiver 130 may be configured to provide the position of the ground station 104 and the landing site to operators at the ground station 104 and to the UAV 110. As described in detail below, each UAV 110 may include a dedicated GPS receiver for calculating the position of the UAV 110 and may communicate an associated position data to the ground station 104 over a terrestrial RF receiver 132 in communication with the ground station 104.

A terrestrial RF emitter 109 may emit signals to the UAV 110 so the UAV 110 will know the location of the ground station 104 and/or a landing site. Other emitters configured for terrestrial communication with the UAV 110 may be included, such as a visual band emitter 133. In one embodiment, the terrestrial RF emitter 109 may emit signals to the UAV 110 to generally communicate commands to the UAV 110.

In one embodiment, the operator 106 is located at the ground control station 104 for management of the off-center parachute deployment from the UAV 110. It is possible to have more than one operator for management of the UAV 110. If the UAV 110 has lost power or experienced other difficulties rendering the UAV 110 unable to maintain flight, the operator 106 may trigger the descent of the aircraft 110 by deploying the off-center parachute. In another embodiment, the operator 106 may be located remotely from the ground control station 104 and/or landing site 102.

Figure 2:
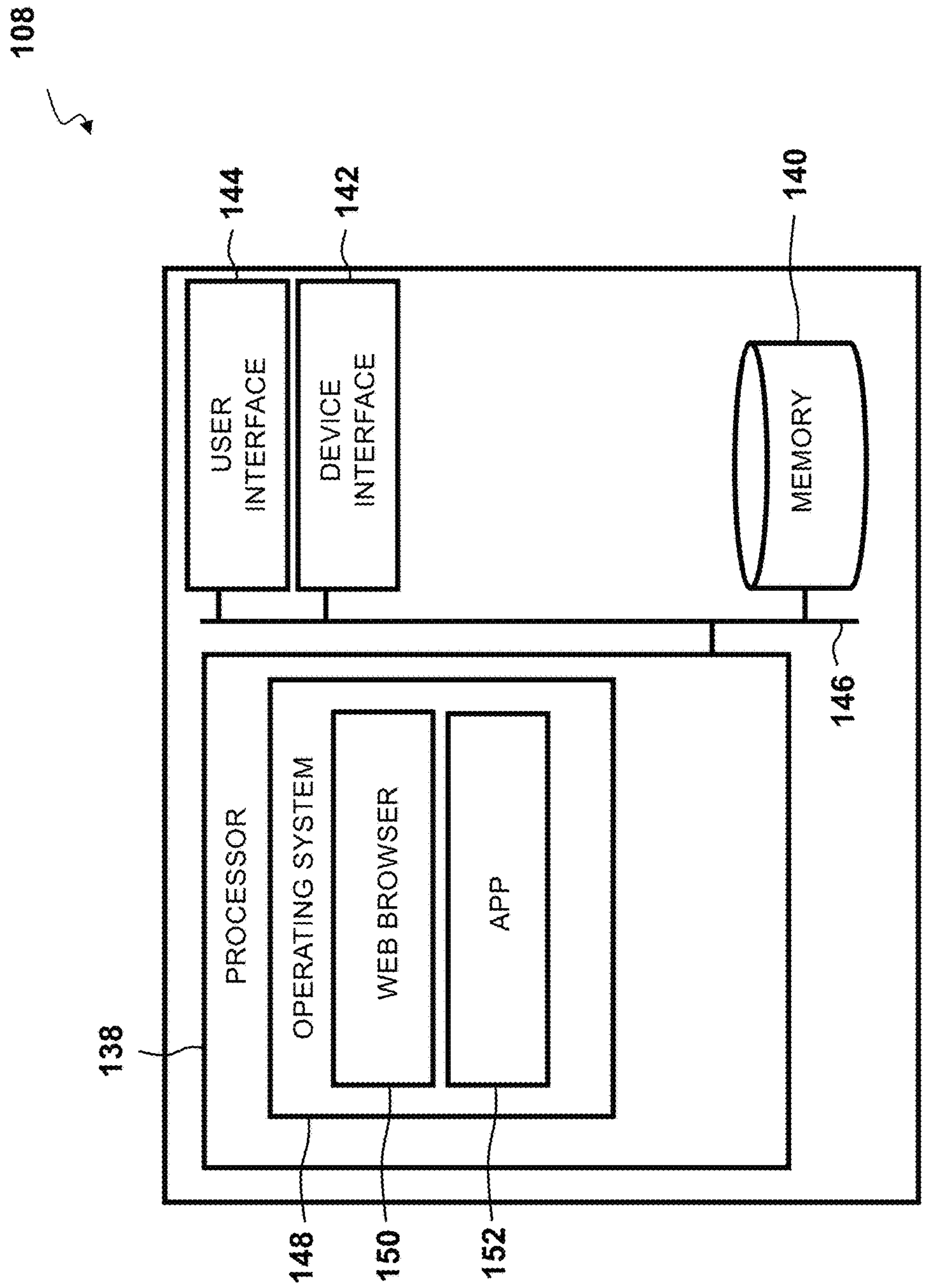
FIG. 2 illustrates a top-level functional block diagram of a computing device of the unmanned aerial vehicle of FIG. 1, according to one embodiment.

The operator 106 may control various aspects of the UAV 110. For example, it is possible that the return of a UAV is on a pre-determined schedule, such as every 100 days. However, if the UAV 110 loses power and needs to descend ahead of schedule, the operator 106 may override the schedule and trigger the UAV 110 to deploy the associated parachute and descend to the landing site 102 or another site if the UAV 110 is at a distance is considered to be too far away from the landing site 102, for example, out of visual range. While the operator 106 is depicted as a person, the operator 106 may be a processor having addressable memory, such as shown in FIG. 2. The control of the UAV 110 and/or deployment of the parachute on the UAV 110 may be via the operator 106 in some embodiments. In other embodiments, control of the UAV 110 and/or deployment of the parachute on the UAV 110 may be via the ground control station 104, an autonomous system, a semi-autonomous system, or the like. In some embodiments, the ground control station 104 may include the terrestrial GPS receiver 130, terrestrial RF emitter 109, terrestrial RF receiver 132, and/or visual band emitter 133. In other embodiments, the ground control station 104 may be in communication with the terrestrial GPS receiver 130, terrestrial RF emitter 109, terrestrial RF receiver 132, and/or visual band emitter 133.

FIG. 2 illustrates an example of a top-level functional block diagram of a computing device 108 operated by the operator of the ground control station. The computing device 108 comprises a processor 138, such as a central processing unit (CPU), addressable memory 140, an external device interface 142, e.g., an optional universal serial bus port and related processing, and/or an Ethernet port and related processing, and an optional user interface 144, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 146. In some embodiments, via an operating system 148 such as one supporting a web browser 150 and applications 152, the processor 138 may be configured to execute steps to for deployment of an off-center parachute of a UAV.

The terrestrial RF emitter 109, as shown in FIG. 1, may be in communication with the processor 138 of FIG. 2. More specifically, the operator 106 may execute a command at the computing device 108 with the application 152. The processor 138 may process the command and communicate to the RF emitter 109 to emit a radio frequency signal to be received by the UAV 110. In one embodiment, the RF emitter 109 is configured to emit an RF signal to the UAV 110 for deployment of an off-center parachute.

Figure 3:
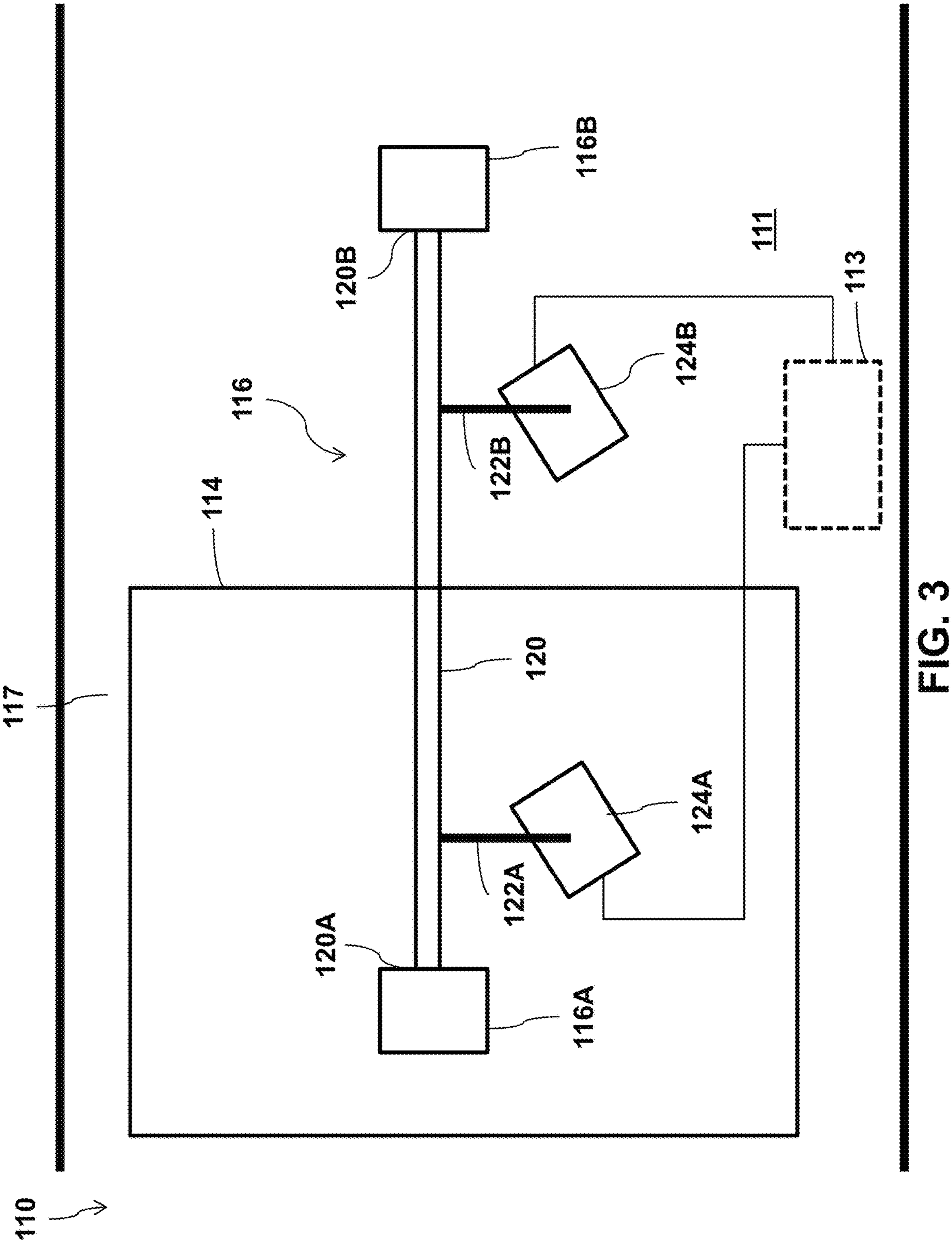
FIG. 3 depicts a partially transparent side elevation view of the off-center parachute system of FIG. 1, according to one embodiment.

With respect to FIG. 3, the UAV 110 may have a door 114 disposed on one side 117 (see also FIG. 1) of the UAV 110. The UAV 110 of FIG. 3 is shown as partially transparent so as to illustrate the components in the disclosed system and method. The door 114 may be secured shut with a locking mechanism, such as a latching mechanism 116. The latching mechanism 116 is capable of releasing a parachute 118 (see FIG. 5). In one embodiment, the latching mechanism 116 may be comprised of a first panel 116A secured to the door 114 and a second panel 116B attached to a body 111, such as the fuselage of the UAV 110. In another embodiment, both latch panels 116A,B are attached to the door 114. In yet another embodiment, both latch panels 116A,B are attached to the body 111. The panels 116A,B may be made of light-weight, durable material such as carbon fiber, titanium, aluminum, and the like. In one embodiment, the first and second panels 116A,B are made of the same material. In another embodiment, the first and second panels 116A,B are made of different materials.

In one embodiment, latching mechanism 116 further includes a string 120 attached to the panels 116A,B for securing the door 114 shut or in a closed position. More specifically, a first end 120A of the string 120 is attached to the first panel 116A, and a second end 120B of the string 120 is attached to the second panel 116B. The latching mechanism 116 may be held closed by the string 120 under tension. In one embodiment, when the string 120 is burned, the door 114 may swing away from the fuselage due to gravity and the door 114 may then become detached from the UAV 110 due to the wind force. Configured as such, the string-latch connection ensures that the door 114 is secured shut. In one embodiment, the string 120 is made of lightweight nylon kernmantle (e.g., paracord or 550 cord). Other string materials are possible, such as polyester. The string 120 may be a braided sheath with a high number of interwoven strands for extra strength. In some embodiments, the string 120 may be a rope. In some embodiments, the string 120 may be any combustible material. In some embodiments, a portion of the string 120 may be made from any combustible material.

Figure 5:
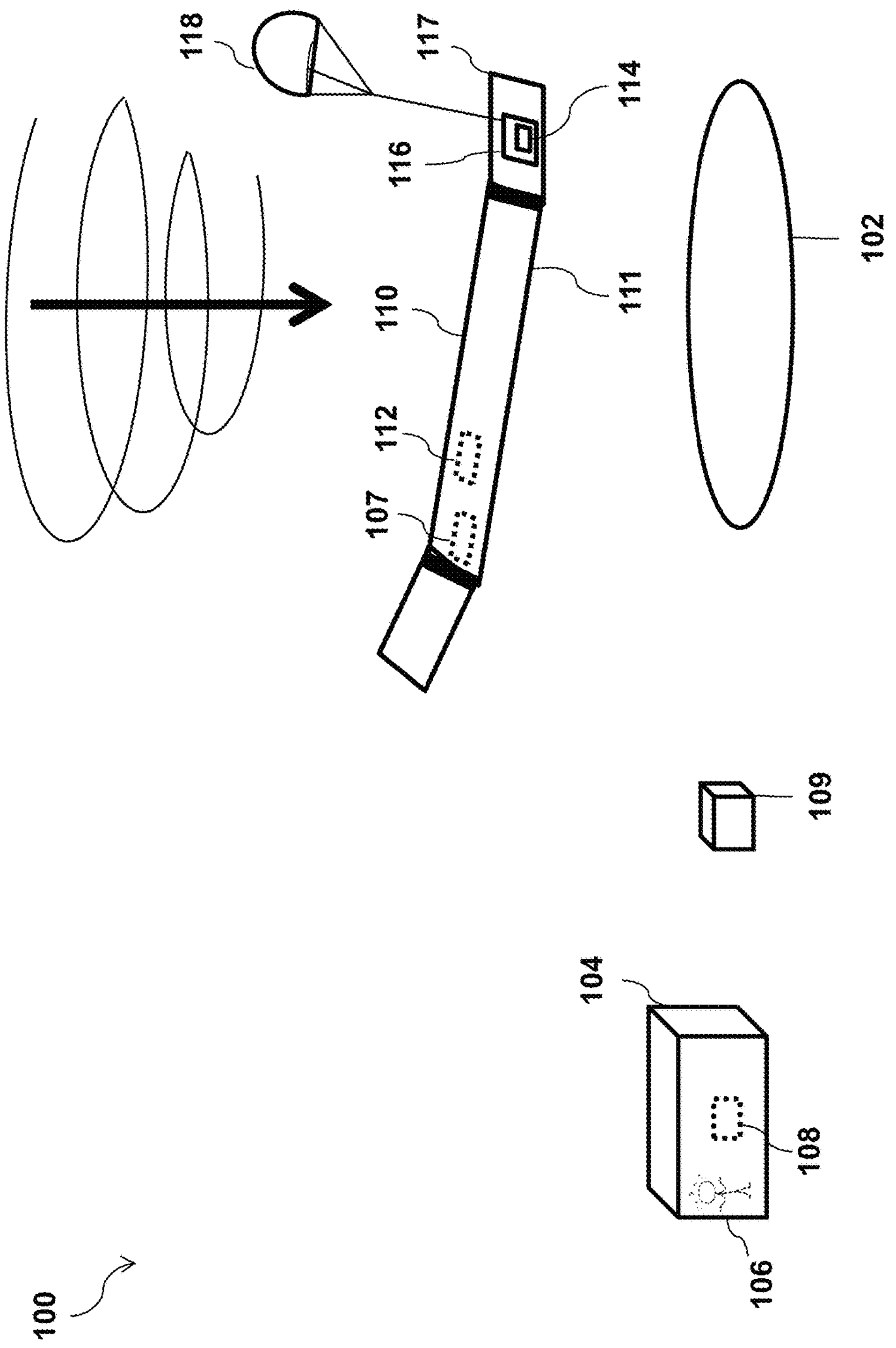
FIG. 5 depicts a process for deployment of an off-center parachute of the unmanned aerial vehicle of FIG. 1, according to one embodiment.

With respect to FIG. 5, an off-center parachute 118 is contained in the UAV 110 behind the door 114. The parachute 118 may provide a controlled and predictable descent of the UAV 110 in the case of unexpected loss of power to the UAV 110 or another catastrophic anomaly. By deploying the single parachute 118 on the side 117 of the UAV, i.e., off center, the UAV 110 will spiral down to the ground. More specifically, when the parachute 118 is deployed, the parachute may cause a drag force, e.g., aerodynamic drag, on the side 117 of the UAV 110. Since the parachute 118 is located on the side 117 and not in the center of the UAV 110, the drag force slows down the one side 117 more than the other side of the UAV 110. This causes a twisting force, or torque on the UAV 110, resulting in rotation of the UAV 110. The drag force combined with the induced torque will cause the UAV 110 to exit the current flight pattern and spiral down towards the ground.

The amount of drag and rotation experienced by the UAV 110, and hence, the rate of descent may be based on the size, shape, and location of the parachute in the UAV 110. The temporal rate of decrease in altitude may be referred to as the rate of descent or sink rate. More specifically, the parachute 118 may be of a size that is substantially large enough to generate a desired descent or sink rate.

In one embodiment, the parachute 118 may, for example, be approximately 11 feet in diameter with an effective drag area of approximately 143 square feet, thus generating a sea level equivalent sink rate of approximately 200 feet per minute. The sea level equivalent sink rate may be a function of the drag coefficient, the density of air, and velocity of the UAV 110. Additionally, the location of the off-center parachute 118 may be located at a distance from the center of the UAV 110 such that as the UAV 110 turns, the UAV 110 does not become unstable while turning. In one embodiment, the parachute 118 may be placed a distance of, for example, 37 feet from the center of the UAV 110, or approximately 14% wingspan of the UAV 110.

In the event that power for steering or general yaw control movement is restored for the UAV 110 after a triggering event or failure, then the turning of the UAV 110 may be stopped. In one embodiment, power is restored to the motor 112 to allow for steering control of the UAV 110. In another embodiment, the UAV 110 has more than one motor 112 and turning of the UAV 110 may be controlled by giving each motor 112 a different thrust, allowing the turning of the UAV 110 to be halted. Other factors may be relevant for descent rate, such as the density of air at the altitude of parachute deployment, and the drag coefficient of the parachute.

In one embodiment, the parachute 118 is a so-called drogue parachute, which is smaller than a conventional parachute that might otherwise tear apart due to the speed of the UAV 110. In one embodiment, the parachute 118 is made of Nylon. Other parachute materials are possible and contemplated, such as canvas, silk, Terylene, Dacron, and Kevlar. The parachute may have a diameter between five feet and twenty feet on a tether between twenty feet and fifty feet in length. Other parachute diameters and tether lengths are possible and contemplated based on the size of the UAV.

As shown in FIG. 3, the latching mechanism 116 maintains the door 114 securely shut. In order to release the latching mechanism 116 and deploy the parachute 118, the string 120 must be severed. To that end, two or more identical burn wires 122A,B are spaced along the string 120. In one embodiment, the burn wires 122A,B are made of nichrome (NiCr), which is typically a combination of various alloys of nickel and chromium as well other possible elements, such as iron and platinum. The burn wires 122A,B are a poorly conducting material (e.g., have low thermal conductivity) and may be used for heating, and, hence, burning of the string 120. The burn wires 122A,B may also conduct electricity inefficiently, e.g., have low thermal conductivity, in order to heat up. Furthermore, the wires 122A,B may develop an outer layer of chromium oxide, which is thermodynamically stable in air. Otherwise, the burn wires 122A,B would oxidize quickly in air when heated, and become brittle and likely break. The burn wires 122A,B may include a first burn wire 122A and a second burn wire 122B.

Attached to each of the burn wires 122A,B are one or more respective radio modules 124A,B. The radio modules 124A,B contain electronic elements that allow for communication with the RF emitter 109, as well as electronics for heating the burn wires 122A,B to burn the string 120 and deploy the parachute 118. In one embodiment, the radio modules may be one-way radio modules for receiving signals from the RF emitter 109. In another embodiment, the radio modules 130 may be two-way radio modules that may receive signals from the RF emitter 109 and transmit signals to the RF receiver 132, as shown in FIG. 1. In one embodiment, the two radio modules 124A,B are identical. In another embodiment, one of the radio modules may have additional circuitry elements. One of the radio modules 124A may be affixed to the door 114 and the other module 124B may be attached to the body 111 of the UAV 110, or vice versa. In another embodiment, both of the modules 124A,B are attached to the door 114. In yet another embodiment, both of the modules 124A,B are attached to the body 111 of the UAV 110. Accordingly, any combination of the above may be implemented. While two burn wires 122A,B and two radio modules 124A,B are shown, any number of burn wires and radio modules are possible and contemplated.

Figure 4:
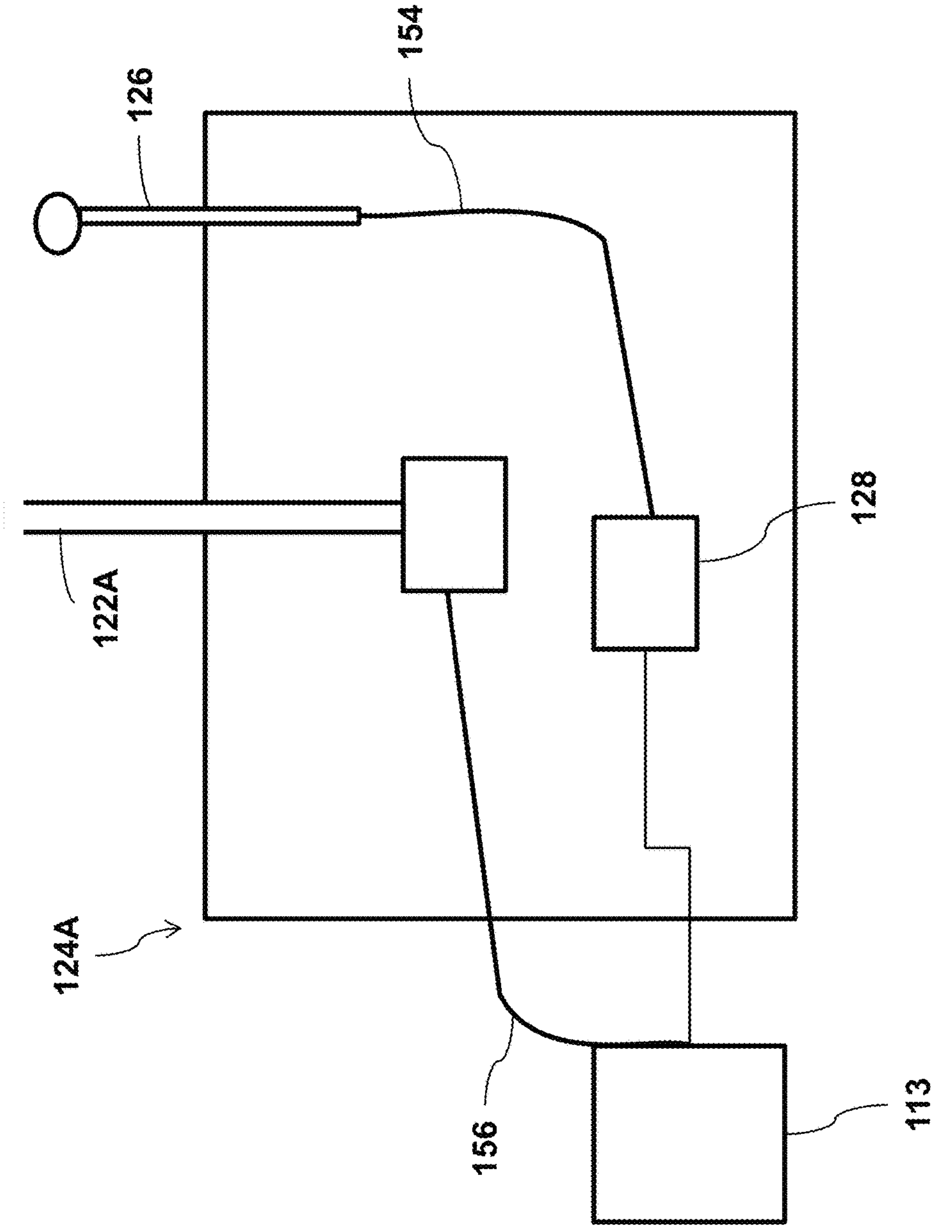
FIG. 4 depicts a radio module associated with the off-center parachute system of FIG. 3, according to one embodiment.

With respect to FIG. 4, a radio module, such as radio module 124A, may have an antenna 126 for receiving a radio frequency signal from the RF emitter 109, as shown in FIG. 1. The antenna 126 may be tuned to the same frequency as the RF emitter 109, as shown in FIG. 1. The antenna 126 may be made of metal. In one example, each antenna 126 may be made of copper. Other materials are possible, such as aluminum or stainless steel. The radio module 124A may also have an interface 128, e.g., an array of status lights, sensors and one or more toggle switches, and/or a touch screen.

In one aspect of the embodiments, the operator 106, as shown in FIG. 1, executes a command to deploy the off-center parachute 118, as shown in FIG. 5, for a controlled descent and predictable crash landing at a location in the case of power loss to the UAV 110 or some other anomaly. Typically, when power is lost to the UAV 110, there is a backup battery onboard. The backup power may be used to power the radio modules 124A,B. If the UAV 110 is at high altitude, the operator may wish to deploy the parachute 118 for a controlled descent and a predictable crash landing location. If the UAV 110 is already close enough to the ground, then the UAV 110 may descend with the backup power provided or with regenerative power supplied by motors of the UAV 110.

In one embodiment, when power is lost in the UAV 110 the parachute 118 does not automatically deploy. Rather, the autopilot mechanism of the UAV 110 may begin to land the plane as soon as power is lost, and deployment of the parachute is manually controlled by the operator 106. More specifically, the operator 106 may execute a command at the computing device 108 with the application 152. The processor 138 may process the command and communicate to the RF emitter 109 to emit a radio frequency signal to be received by the UAV 110. In one embodiment, a radio frequency burn signal 129 is sent from the RF emitter 109 to one of the radio modules 124A of the UAV 110. If the radio module 124A does not receive the signal or it is malfunctioning, the operator 106 executes a command to transmit the RF burn signal 129, as shown in FIG. 1, to radio module 124B associated with the second burn wire 122B. This provides for a redundant and independent system. In another embodiment, the radio frequency burn signal 129, as shown in FIG. 1, is sent from the RF emitter 109 to both of the radio modules 124A,B simultaneously, and both burn wires 122A,B are activated.

In another embodiment, the RF burn signal 129 may be transmitted to a flight control computer (FCC) 107 (see FIG. 1) onboard the UAV 110. The FCC 107 may be in communication with either or both of the radio modules 124A,B to direct the burn signal 129 to the burn wires 122A,B. In another embodiment, the FCC 107 onboard the UAV 110 may determine that an emergency landing is needed and thereby executes a command to deploy the off-center parachute 118 for a controlled descent and predictable crash landing location, for example, in the case of power loss to the aircraft 110 or some other catastrophic anomaly detected immediately at the UAV 110 without the need to involve the operator 106.

In one embodiment, the antenna 126 receives the burn signal 129 from the RF emitter 109 for the flight termination system 100 to activate the burn wires 122A,B. More specifically, and with respect to FIG. 4, the interface 128 receives the burn signal 129 from an output 154 of the antenna 126 and toggles a UAV backup battery 113 to pass current from an output 156 to the conducting burn wires 122A,B, causing the wires 122A,B to increase in temperature. The heat dissipated by each burn wire 122A,B is a function of the particular burn wire's resistivity and thickness. In one embodiment, the burn wire 122A,B is sufficiently heated by the electrical current generated by the backup battery 113 to burn the wire. In such embodiments, the current running through the wire may be approximately 2-3 Amps. In one embodiment, the burn wires 122A,B are approximately 0.010 inches in diameter. In one embodiment, wires 122A,B take 1-15 seconds to melt the string 120, depending on the backup battery 113 voltage and the ambient temperature.

When the string 120 is severed, the door 114, as shown in FIG. 3, opens and the parachute 118, as shown in FIG. 5, deploys. In one embodiment, if the string 120 is not melted by the first burn wire 122A of radio module 124A, the operator 106 executes a command to transmit the RF burn signal 129 to radio module 124B associated with the second burn wire 122B to open the door. In another embodiment, the radio frequency burn signal 129 is sent from the RF emitter 109 to both of the radio modules 124A,B, and both burn wires 122A,B are activated simultaneously. That is, the operator 106 or the UAV 110 may determine, via various sensors, whether the deployment was successful and if not, initiate the second or backup means for deployment of the parachute 118.

Embodiments of the system 100 provide for a redundant and independent system for safe landing of the UAV 110 in the case of power loss or other malfunction of the aircraft. The operator 106 transmits the burn signal 129 via the terrestrial RF emitter 109 to the antennae 126 of the radio modules 124A,B. The interface 128 receives the burn signal 129 from an output 154 of the antenna 126 and toggles the UAV backup battery 113 to pass current from an output 156 to the conducting burn wires 122A,B, causing the wires 122A,B to increase in temperature. The burn wire 122A,B, in turn, dissipates heat to melt the string 120 of the latching mechanism 116, thereby causing the door 114 to open and deploy the off-center parachute 118, allowing the UAV 110 to spiral down in a controlled and predictable manner to the landing area or a safe ditch site away from the landing area. If the first burn wire is unsuccessful, the operator 106 sends the burn signal 129 to an independent and redundant second burn wire of the radio module 124B to ensure the off-center parachute 118 is released.

Figure 6:
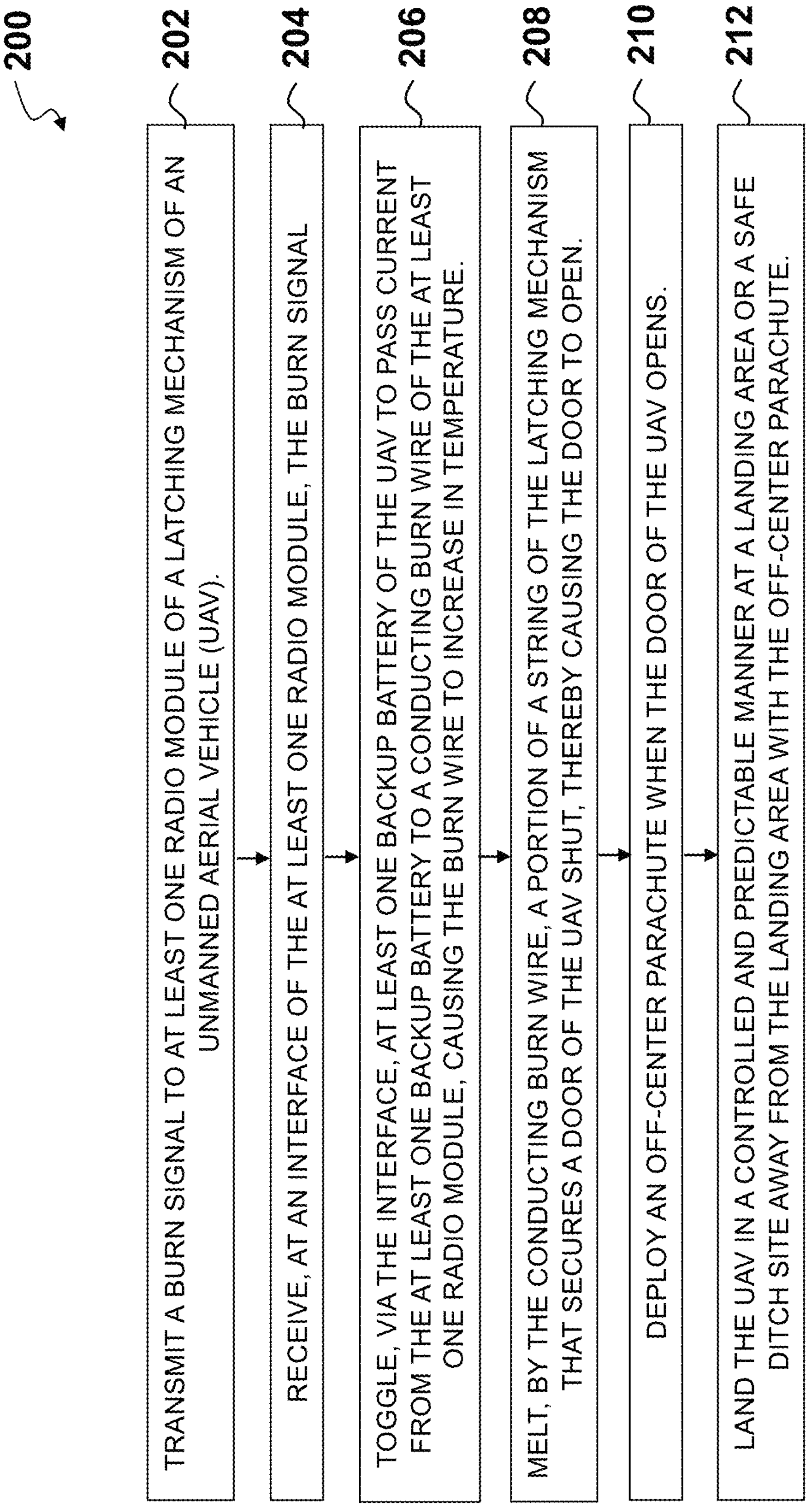
FIG. 6 depicts a flow diagram of a method for deploying an off-center parachute of an unmanned aerial vehicle, according to one embodiment.

With respect to FIG. 6, a flowchart of a method 200 for providing a redundant and independent flight termination system for safe landing of an unmanned aerial vehicle (UAV) in the case of power loss or other malfunction of the UAV is illustrated. An operator and/or a ground control station may transmit a burn signal via a terrestrial radio frequency (RF) emitter to at least one radio module of a latching mechanism of the UAV (step 202). An interface of the at least one radio module receives the burn signal (step 204). In some embodiments, the at least one radio module may include an antenna for receiving signals. The interface may toggle, via the interface, at least one backup battery of the UAV to pass current from the at least one backup battery to a conducting burn wire of the at least one radio module, causing the burn wire to increase in temperature (step 206). The burn wire, in turn, dissipates heat to melt a string of the latching mechanism that holds a door of the UAV shut, thereby causing a door of the UAV to open (step 208). The door may be released from the UAV by wind resistance, gravity, or the like once the latching mechanism is no longer holding the door in place. When the UAV door opens, an off-center parachute is deployed (step 210). The off-center parachute allows the UAV to spiral down and land in a controlled and predictable manner to a landing area or a safe ditch site away from the landing area (step 210). In some embodiments, if the first burn wire is unsuccessful, the operator and/or ground control station may send the burn signal to an independent and redundant second burn wire of a second radio module of the latching mechanism to ensure the off-center parachute is released. In another embodiment, the radio frequency burn signal may be sent from the RF emitter to both of the radio modules, and both burn wires are activated simultaneously. That is, the operator or the UAV may determine, via various sensors, whether the deployment was successful and if not, initiate the second or backup means for deployment of the parachute. In other embodiments, the second burn wire may receive current from the backup battery to melt the string if the first burn wire does not melt the string, cause the door to open, and deploy the parachute.

In another embodiment, the RF burn signal may be transmitted to a flight control computer (FCC) onboard the UAV. The FCC 107 may be in communication with either or both of the radio modules to direct the burn signal to the burn wires. In another embodiment, the FCC onboard the UAV may determine that an emergency landing is needed and thereby executes a command to deploy the off-center parachute for a controlled descent and predictable crash landing location, for example, in the case of power loss to the UAV or some other catastrophic anomaly detected immediately at the UAV without the need to involve the operator.

Figure 7:
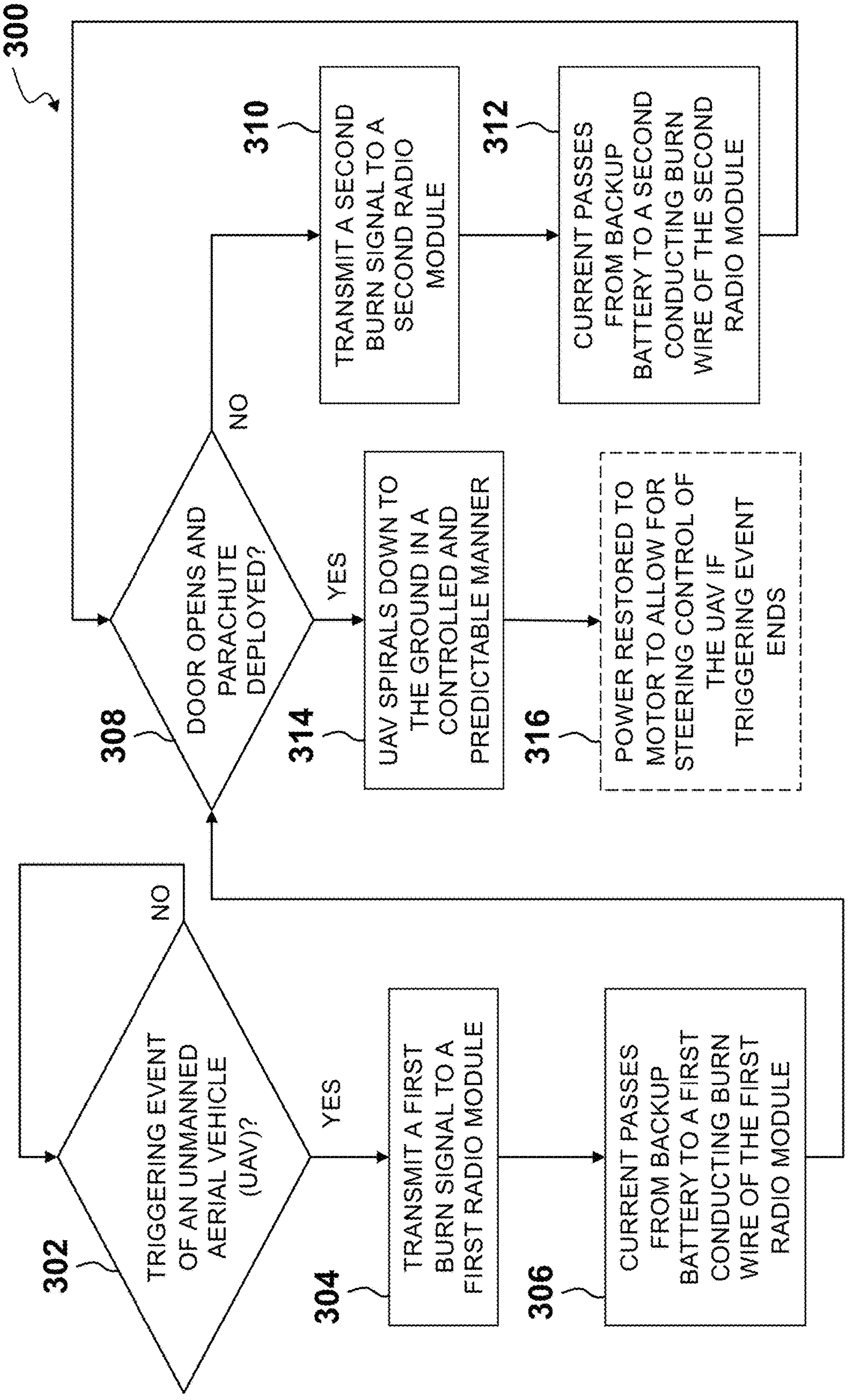
FIG. 7 depicts a high-level flowchart of a method embodiment for a flight termination system of an unmanned aerial vehicle, according to one embodiment.

FIG. 7 depicts a high-level flowchart of a method 700 embodiment for a flight termination system of an unmanned aerial vehicle, according to one embodiment. The method 300 may include checking for a triggering event of an unmanned aerial vehicle (UAV) (step 302). The triggering event may be a loss in power of the UAV, a loss of control of one or more electric motors of the UAV, a loss in communication between the ground control station and the UAV, or the like. If there is no triggering event, the method 700 may continue to check for a triggering event. The triggering event may be determined by an operator of the ground control system, a processor of the ground control system, a processor of the UAV, or the like. If there is a triggering event, the ground control system and/or operator may transmit a first burn signal to a first radio module (step 304). The UAV may contain two or more redundant radio modules. Current passes from a backup battery to a first conducting burn wire of the first radio module (step 306). The first radio module may send a signal and/or activate a switch to allow power to flow from a backup battery to a first conducting burn wire. The first conducting burn wire may cause a string of a latching mechanism to burn and separate. The string of the latching mechanism may hold a door in place during operation of the UAV. When the string is separated, the door can open and a parachute located in the UAV can deploy (step 308).

If the door does not open and the parachute does not deploy (step 308), this may indicate a problem with the first radio module, backup battery, and/or first conducting burn wire. The ground control system and/or operator may then transmit a second burn signal to a second radio module (step 310). In some embodiments, the second radio module may be identical to the first radio module. Current passes from a backup battery to a second conducting burn wire of the second radio module (step 312). The second radio module may send a signal and/or activate a switch to allow power to flow from a backup battery to a second conducting burn wire. The second conducting burn wire may cause a string of a latching mechanism to burn and separate.

Once the door opens and the parachute is deployed, the UAV spirals down to the ground in a controlled and predictable manner (step 314). Optionally, power may be restored to the UAV, one or more motors of the UAV, and/or one or more control systems of the UAV, which may allow for steering control of the UAV if the triggering event ends (step 316). The ground control system and/or the operator may control the UAV to halt the spiral and land the UAV at a desired location.

Figure 8:
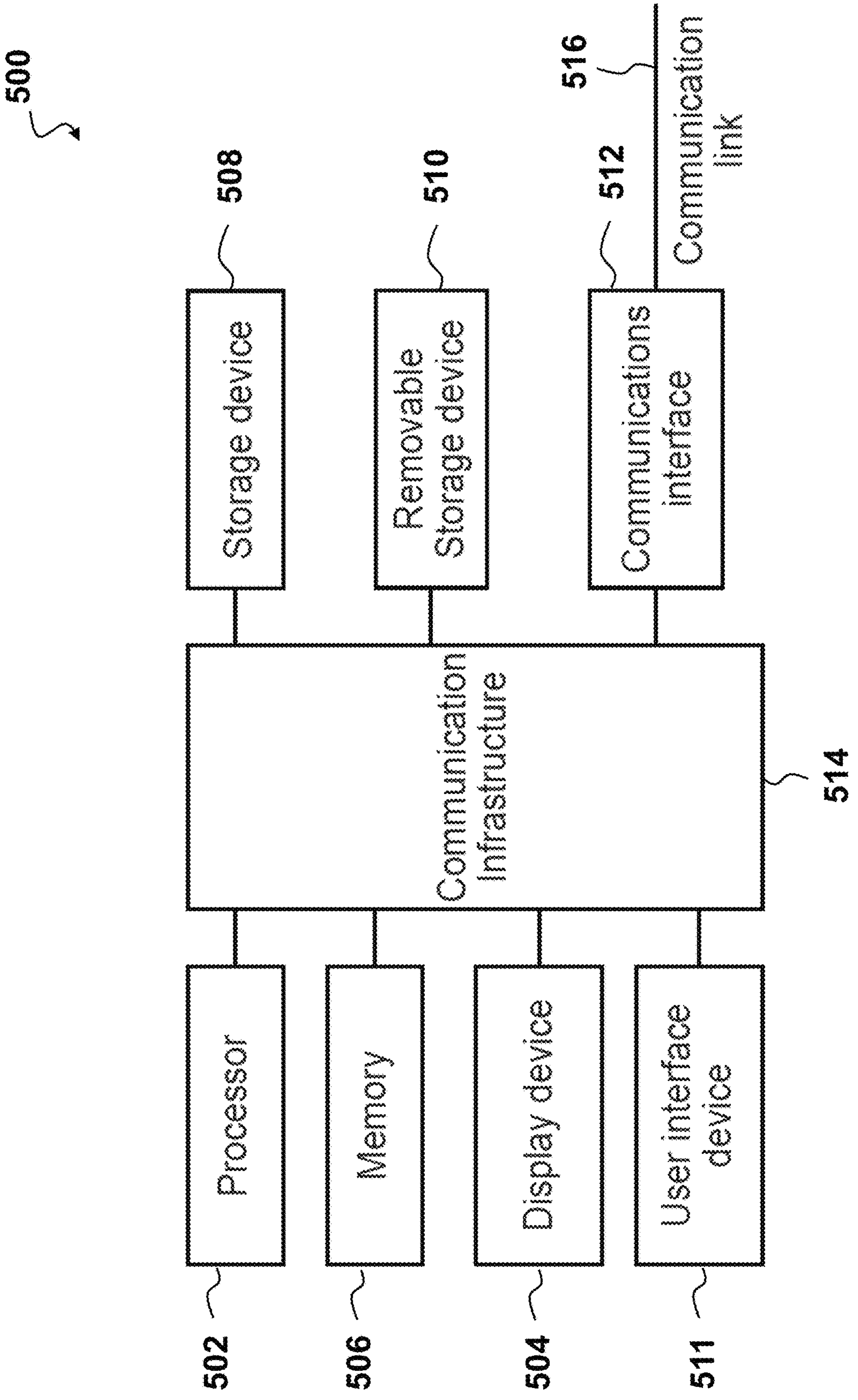
FIG. 8 shows a high-level block diagram and process of a computing system for implementing an embodiment of the system and process.

FIG. 8 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCM CIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 9:
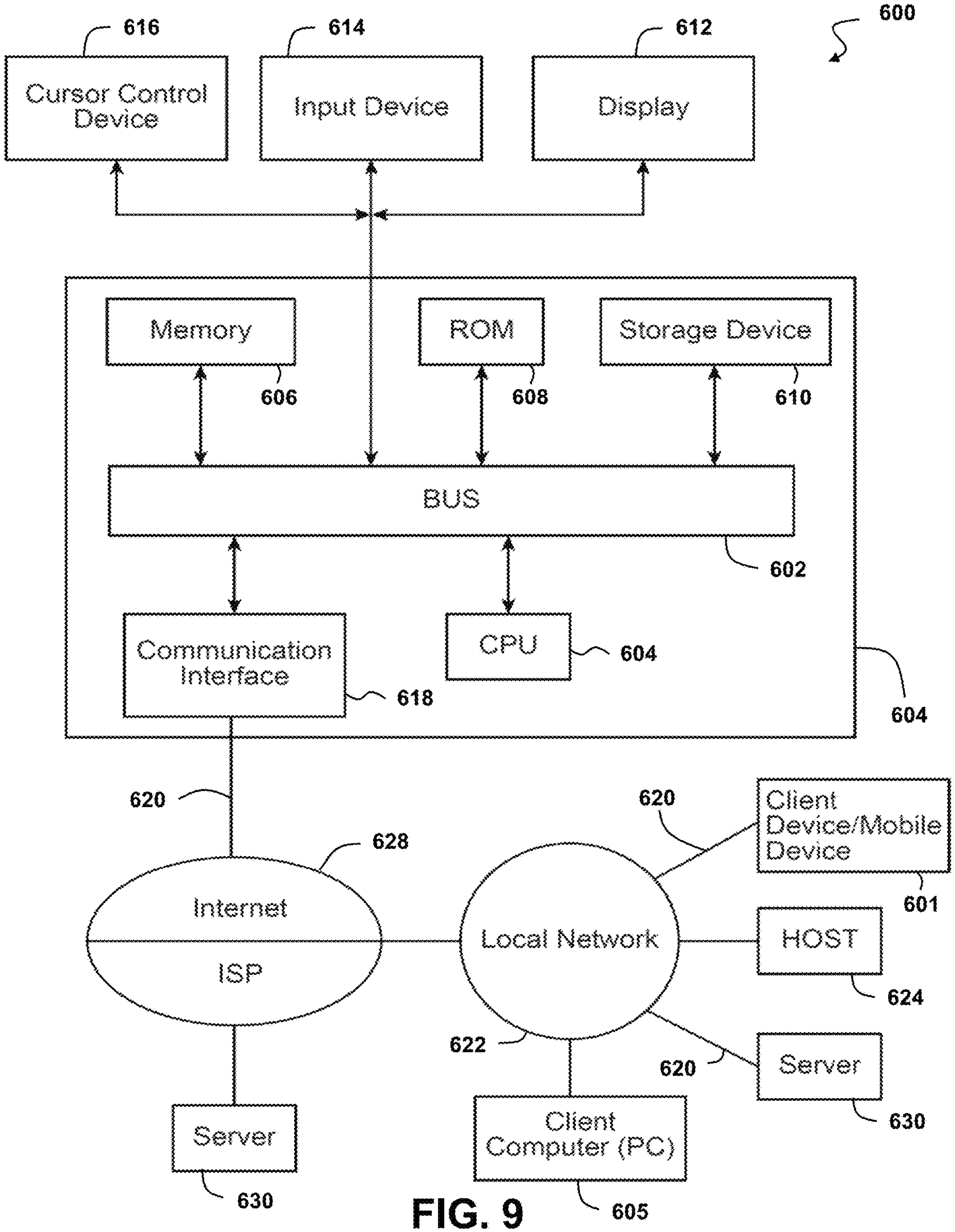
FIG. 9 shows a block diagram and process of an exemplary system in which an embodiment may be implemented.

FIG. 9 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, where a user can utilize one or more computers 605 to manage data in the server 630.

Figure 10:
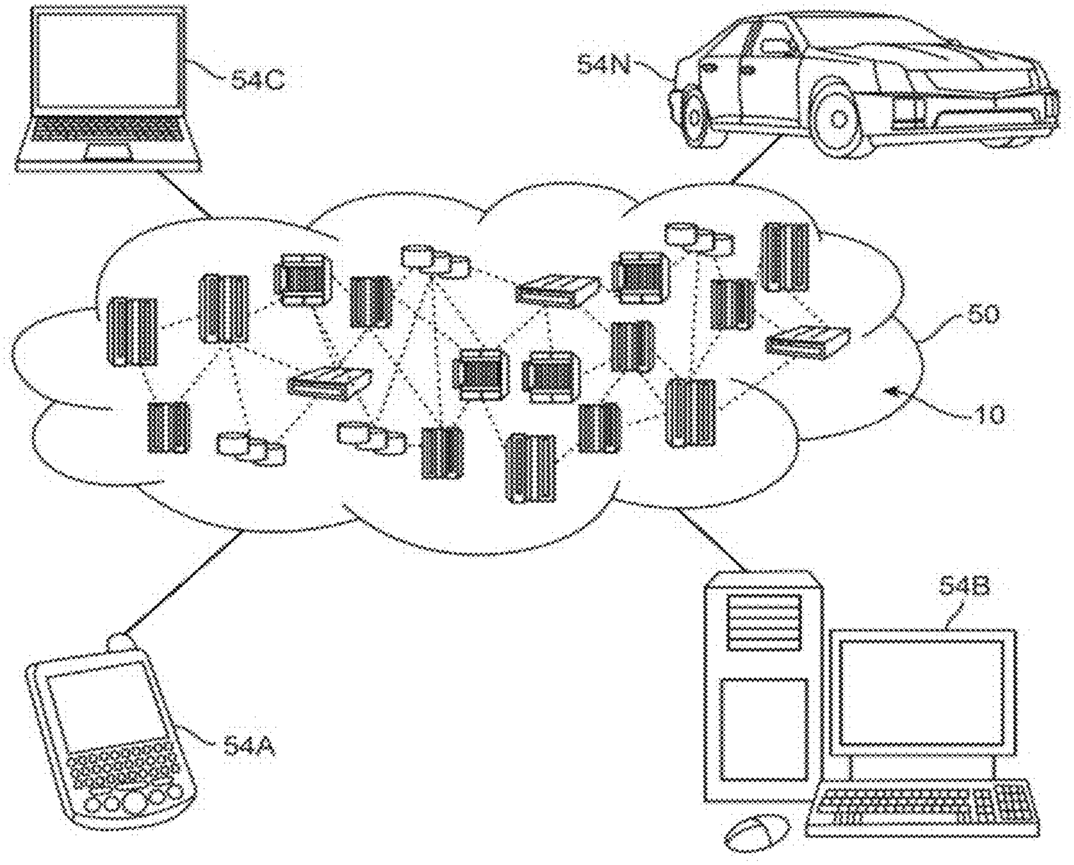
FIG. 10 depicts a cloud computing environment for implementing an embodiment of the system and process disclosed herein.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:

at least two radio modules in communication with at least one of: a ground control station (GCS) and a flight control computer (FCC) of an unmanned aerial vehicle (UAV); and at least two burn wires in contact with a portion of a string configured to secure a door of the UAV, wherein each burn wire of the at least two burn wires is attached to a respective radio module of the at least two radio modules;

a first panel configured to attach to a portion of the UAV; and a second panel configured to attach to a portion of the UAV distal from a first latch;

wherein the string is configured to be connected between the first panel and the second panel; and wherein at least one of the at least two radio modules are configured to receive a burn signal from at least one of: the GCS and the FCC, wherein current from a backup battery passes to a corresponding burn wire of the at least two burn wires based on receiving the burn signal, wherein the corresponding burn wire is attached to the at least one radio module that is configured to receive the burn signal.

2. The system of claim 1, wherein the string is configured to secure the door of the UAV shut.

3. The system of claim 2, wherein each burn wire is configured to melt the portion of the string in contact with each burn wire causing the connection between the first panel and the second panel to be broken.

4. The system of claim 3, wherein the door of the UAV is separated from a rest of the UAV when the connection between the first panel and the second panel is broken.

5. The system of claim 1, further comprising:

a parachute disposed in the UAV, wherein the parachute is configured to be deployed when the door of the UAV is separated from the UAV.

6. The system of claim 5, wherein the parachute is disposed off-center of the UAV.

7. The system of claim 6, wherein deploying the parachute causes a drag force on a first side of the UAV, wherein the drag force slows down the first side of the UAV more than a second opposite side of the UAV inducing a torque on the UAV which results in a rotation of the UAV.

8. The system of claim 7, wherein the drag force combined with the induced torque causes the UAV to exit a current flight pattern and spiral down towards the ground.

9. The system of claim 7, wherein the first radio module comprises:

an antenna; and an interface configured to receive the burn signal from the antenna, wherein the interface toggles the backup battery to pass current to a first burn wire of the at least two burn wires.

10. The system of claim 1, wherein the ground control station is in communication with a terrestrial GPS receiver, a terrestrial RF emitter, a terrestrial RF receiver, and a visual band emitter.

11. The system of claim 1, wherein the string is made of a combustible material.

12. The system of claim 1, wherein the at least two burn wires are made of nichrome (NiCr).

13. A method comprising:

receiving a burn signal at an interface of a radio module of two or more radio modules from at least one of: a ground control station (GCS) and a flight control computer (FCC) of an unmanned aerial vehicle (UAV);

toggling, via the interface, at least one backup battery to pass current from the at least one backup battery to a conducting burn wire attached to the radio module of two or more radio modules, wherein the conducting burn wire is attached to a portion of a string; and melting, by the conducting burn wire, the portion of the string, wherein the string is connected between a first panel and a second panel.

14. The method of claim 13, wherein the string is made of a combustible material, and wherein the conducting burn wire is made of nichrome (NiCr).

15. The method of claim 13, wherein the first panel is configured to attach to the door of the UAV, wherein the second panel is configured to attach to a portion of the UAV distal from the first panel.

16. The method of claim 15, further comprising:

separating the door of the UAV from a rest of the UAV when the connection between the first latch and the second latch is broken.

17. The method of claim 14, further comprising:

deploying an off-center parachute when the door of the UAV separates from the UAV, wherein deploying the parachute causes a drag force on a first side of the UAV, wherein the drag force slows down the first side of the UAV more than a second opposite side of the UAV inducing a torque on the UAV which results in a rotation of the UAV, and wherein the drag force combined with the induced torque causes the UAV to exit a current flight pattern and spiral down towards the ground.

18. The method of claim 17, further comprising, prior to receiving the burn signal at the interface of the radio module:

determining, by the FCC of the UAV, that an emergency landing of the UAV is needed; and generating, by the FCC of the UAV, the burn signal in response to the determination that the emergency landing of the UAV is needed.

* * * * *